April 14, 1964   R. S. BUJNOWSKI   3,129,020
TRAY DRAINHOSE NIPPLE
Filed April 10, 1961
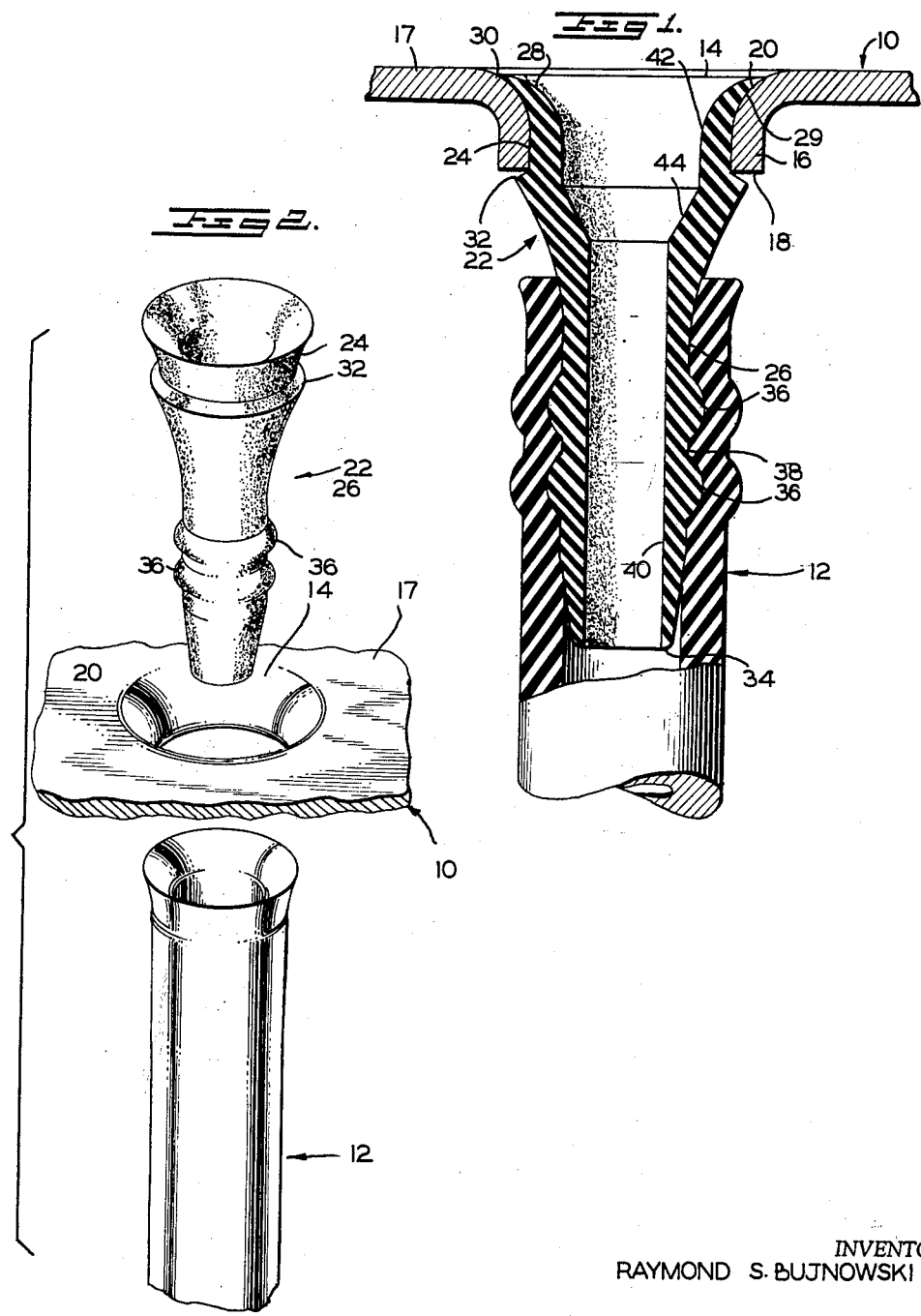
INVENTOR
RAYMOND S. BUJNOWSKI
BY J. J. Soucek
ATTORNEY

United States Patent Office 3,129,020
Patented Apr. 14, 1964

3,129,020
TRAY DRAINHOSE NIPPLE
Raymond S. Bujnowski, Warren, Mich., assignor to General Motors Corporation, Detroit, Mich., a corporation of Delaware
Filed Apr. 10, 1961, Ser. No. 101,710
1 Claim. (Cl. 285—110)

This invention relates to a nipple structure and more particularly to a nipple structure that can be inserted into an aperture, and includes self-retaining and sealing features.

Nipples of the subject type are often utilized for connecting a plate with a hose or for purposes of providing a delivery spout on a container. The container can be a liquid receptacle, and the nipple so constructed and arranged that when assembled with the former, a portion of the nipple clampingly engages the inner edge of an aperture formed in the wall of the receptacle. Ordinarily, the clamping arrangement is sufficient to provide a sealing engagement between the nipple and the aperture, and at times the nipple will have a free end to which an object such as a hose can be attached.

In the past, nipple structures have assumed various configurations some of which required additional members to be mounted with the nipple so as to provide both a clamping and sealing arrangement. The nipple head has been formed so as to extend laterally a distance beyond the edge of the aperture to provide a rigid reaction surface whereby either a barb or radial extension formed on the neck of the nipple cooperates with the reaction surface to clamp the nipple in the aperture. This arrangement results in an obstruction extending above the aperture which can interfere with the placement of an article in the vicinity of the nipple head or directly thereover. Because of this, it has been difficult to utilize a nipple as a drain connection between a plate and a hose, since any liquid on the plate surface would be prevented from flowing into the passage formed in the nipple by the projecting head.

This invention eliminates the above-mentioned problem by providing a nipple structure that can be readily inserted and clamped within an aperture with the head terminating below the surface of the plate in which the aperture is formed. In this manner, an article can be placed directly over the nipple without any interference from the latter and, in addition, the nipple can serve as a liquid drain connection between a plate and a drain hose. Stated broadly, this is accomplished by providing a nipple structure having a radially outwardly flared head portion that cooperates with a deformable shoulder formed on the neck portion of the nipple for clamping the latter in the aperture. The shoulder is shaped to facilitate the insertion of the nipple in the aperture, and the flared head is curved on the outer surface thereof so as to conform to the curvature of the inner edge of the aperture. The shank of the nipple is formed with a pair of radially extending ribs over which a hose is fitted and retained in a fixed position thereby.

It is an object of this invention to provide a nipple structure in which the head portion thereof terminates within or slightly below the plane constituting the surface of a retaining plate.

Another object of this invention is to provide a nipple structure that is readily insertable into an aperture with a minimum amount of force and may be sealingly retained therein.

A further object of this invention is to provide a nipple structure that will sealingly join a plate to a hose without any obstruction existing on the surface of the plate, and can serve as a drainage connection between the two.

A still further object of this invention is to provide a drain nipple structure that is sealingly clamped within an aperture in a plate, and permits an article to be placed directly above the head portion of the nipple.

Other objects and advantages of the present invention will become apparent from a perusal of the accompanying drawings in which:

FIGURE 1 is a sectional view of the subject invention connecting a plate with a drain hose.

FIGURE 2 is a perspective drawing illustrating the subject invention prior to connecting with the drain hose.

Referring to FIGURE 1 of the drawing, the embodiment of the present invention is shown incorporated with a base plate generally indicated by the number 10 and a drain hose 12. The base plate 10 includes an aperture 14 which is formed in the plate 10 by a tool such as a punch. The perforation or aperture resulting from the punch tool includes an annular lip 16 extending below the surface 17 of the plate and terminating with an outer peripheral edge 18. In addition, the body form of the tool causes the metal surrounding the aperture to be curved in a manner as shown by the numeral 20.

The nipple structure, generally indicated by the numeral 22, is tubular in form and comprises a head portion 24 and a shank portion 26. The head portion 24 is formed with an outwardly flared portion 28 having an outer surface 29 that conforms in curvature to the surface 20. The portion 28 is reduced in thickness as it extends radially and terminates with a pointed peripheral lip 30. Adjacent the head portion 24 and immediately below, a generally V-shaped shoulder 32 is circumferentially formed about the tubular body of the nipple structure. The outer diameter of the shoulder is greater than the diameter of the aperture for reasons which will hereinafter be described. The shank portion 26 is integrally formed with the shoulder 32 and tapers downwardly therefrom to a terminal edge 34. A pair of annular ribs 36 are formed about the shank 26 between the shoulder 32 and the terminal edge 34. The ribs are arcuate in cross section and are spaced longitudinally from each other so as to provide a gap 38 therebetween. An opening 40 is formed within the shank portion of the nipple structure 22 and opens into the head portion of the nipple. The head portion includes a counterbore 42 which connects with a tapered bore 44 so as to provide a continuous drain passage through the nipple structure 22.

Referring now to FIGURE 2, it can be seen that the nipple structure 22 is insertable within the circular aperture 14 formed in the plate 10 with the shank portion 26 leading the way. The shank portion of the nipple passes through the aperture 14 without interference up to the point of engagement between the inner surface of the aperture and the shoulder 32 formed on the nipple. At this point, additional pressure in a downward direction must be applied to the head of the nipple so as to compress and deform the shoulder 32, and pass it beyond the edge 18 of the aperture 14. Thereafter the deformed shoulder 32 expands and provides a clamping engagement between the edge 18 and the curved surface 20; this, of course, being caused by the configuration of the head portion of the nipple. As heretofore described, the head portion of the nipple is provided with the outwardly flared portion 28 terminating with the peripheral edge 30. The outer curved portion 29 sealingly grips the curved surface 20 of the aperture 14 and together with the shoulder 32 clamps the entire nipple structure in the aperture 14. The hose 12 may then be inserted with the aperture thereof surrounding the terminal edge 34 of the nipple, and forcibly slid upwardly beyond the ribs 36. The ribs 36 serve to expand the hose at points adjacent the ribs, and thereby provide a clamping effect for maintaining the hose in a fixed postion on the shank 26.

By providing the nipple structure with a head portion having an outer surface that conforms to the curvature of the aperture, we are able to maintain the terminal lip 30 slightly below the surface 17 of the plate 10. In this manner, an object may be placed on the surface of the plate 10 and positioned immediately above the aperture without any interference from the nipple. In addition, any liquid on the surface 17 can readily flow into the nipple passage due to the head portion being recessed in the aperture without any obstructions projecting above the surface. Finally, it should be appreciated that the nipple structure may be formed from a hard rubber or polyethylene or any material that permits it to be resilient and still sufficiently rigid to permit it to be utilized in a manner as described above.

While a specific embodiment of the invention has been illustrated and while certain materials have been suggested as useful in making the nipple structure, it is to be understood that the invention is not limited thereto except as defined by the appended claim.

What is claimed is:

A nipple structure for insertion in a support member, said support member having an opening for receiving said nipple structure wherein said opening is defined by an upper edge, a lower edge, and inwardly and downwardly curved side walls describing a continuous uninterrupted arcuate surface, said nipple structure including a head portion and a shank portion and having a central aperture therethrough, said head portion having its uppermost portion outwardly flared to conform to the curved side walls of said opening, gradually reducing in cross section as it flares outwardly and terminating with a sharp peripheral edge portion, said peripheral edge portion upon insertion of said nipple structure in said opening terminating below the upper edge of said opening, an annular deformable shoulder formed on said head portion between said uppermost flared portion and said shank portion, said flared portion and said shoulder adapted upon insertion of said nipple structure into said opening to cooperate with the curved side walls and lower edge of said opening respectively to clamp and seal said nipple structure in said opening.

References Cited in the file of this patent

UNITED STATES PATENTS

| | | |
|---|---|---|
| 680,684 | Beatty | Aug. 20, 1901 |
| 1,465,617 | Shatz | Aug. 21, 1923 |
| 1,734,757 | Ashley | Nov. 5, 1929 |
| 2,308,310 | Ruemelin et al. | Jan. 12, 1943 |
| 2,690,861 | Tupper | Oct. 5, 1954 |
| 2,981,449 | Perkins | Apr. 25, 1961 |